(12) United States Patent
Mehlberg

(10) Patent No.: US 6,825,485 B1
(45) Date of Patent: Nov. 30, 2004

(54) SYSTEM AND METHOD FOR ALIGNING A ROBOT DEVICE IN A DATA STORAGE LIBRARY

(75) Inventor: Adam Mehlberg, Longmont, CO (US)

(73) Assignee: Storage Technology Corporation, Louisville, CO (US)

( * ) Notice: Subject to any disclaimer, the term of this patent is extended or adjusted under 35 U.S.C. 154(b) by 86 days.

(21) Appl. No.: 10/141,020

(22) Filed: May 8, 2002

(51) Int. Cl.[7] ............................ G01N 21/86; G01V 8/00
(52) U.S. Cl. ............................ 250/559.29; 250/559.33; 250/221; 414/225.01; 414/222.01
(58) Field of Search ........................ 700/215, 218, 700/254, 259; 250/559.29, 559.3, 559.33, 221; 356/614, 620, 622–623, 399–401, 243.1, 4.01; 235/383, 469

(56) References Cited

U.S. PATENT DOCUMENTS

| | | | | |
|---|---|---|---|---|
| 5,219,258 A | * | 6/1993 | Yeakley | 414/275 |
| 5,355,001 A | * | 10/1994 | Fujimoto et al. | 235/494 |
| 5,661,287 A | * | 8/1997 | Schaefer et al. | 235/383 |
| 6,331,714 B1 | * | 12/2001 | Gardner et al. | 250/559.29 |
| 6,438,448 B1 | * | 8/2002 | Manes et al. | 700/218 |
| 6,591,160 B2 | * | 7/2003 | Hine et al. | 700/218 |
| 6,671,574 B1 | * | 12/2003 | Hashimoto | 700/215 |

* cited by examiner

*Primary Examiner*—Stephone B. Allen
*Assistant Examiner*—Patrick J. Lee
(74) *Attorney, Agent, or Firm*—Brooks Kushman P.C.

(57) ABSTRACT

In a data storage library having a plurality of cells for use in housing media cartridges, each cell having a location in the library, the library further having a moveable robot for retrieving the cartridges from the cells, a system and method for aligning the robot with a cell. A target in the library has a first, second and third portion, each with a different reflectivity. A source on the robot directs a beam toward the target portions, and the reflected beam has an intensity based on the reflectivity of the respective target portion. A sensor on the robot senses the reflected beam and generates a signal representing the reflected beam intensity. A controller receives the signal, determines a location of the target in the library relative to the robot based on changes in the reflected beam intensity, and generates a control signal for aligning the robot with the cell based on a known relationship between the target location and the cell.

7 Claims, 4 Drawing Sheets

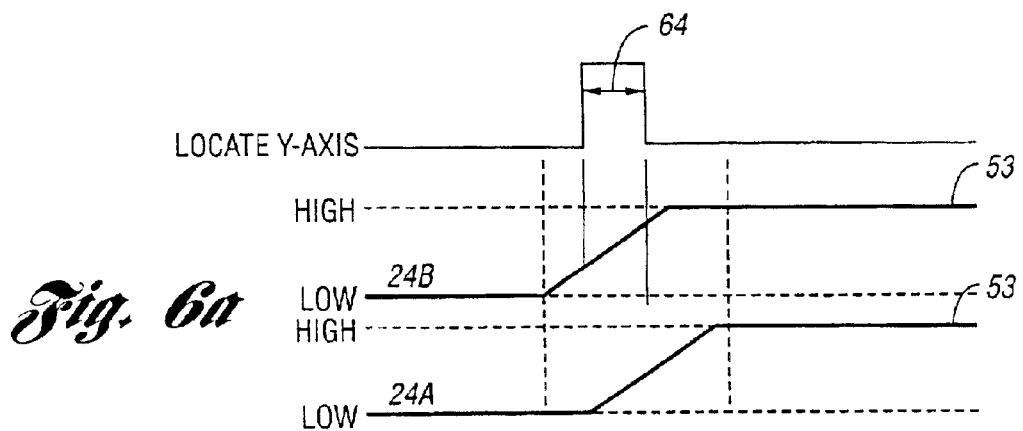
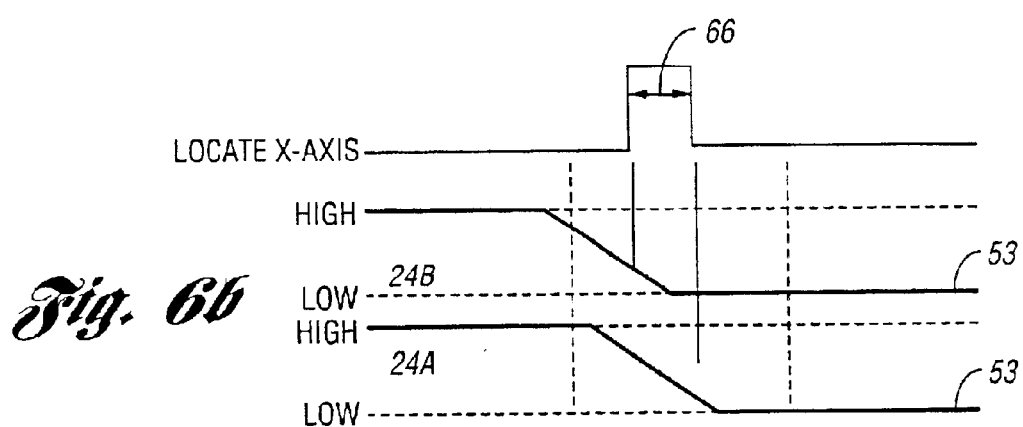
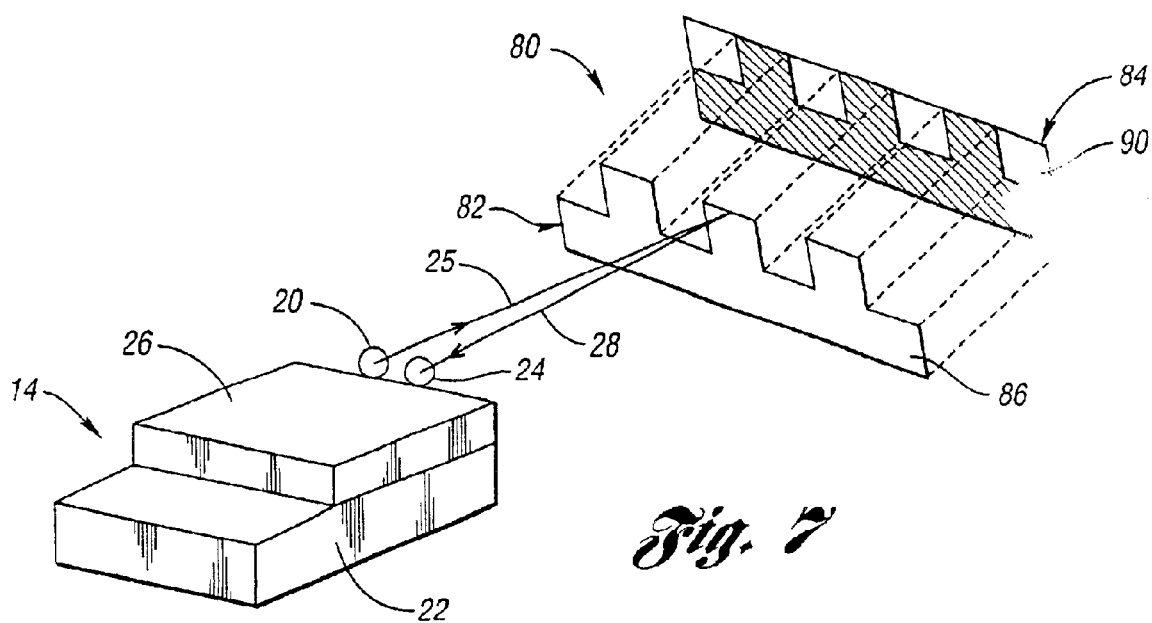

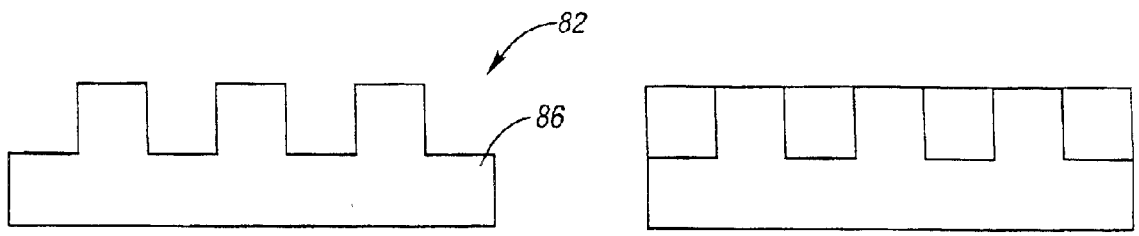
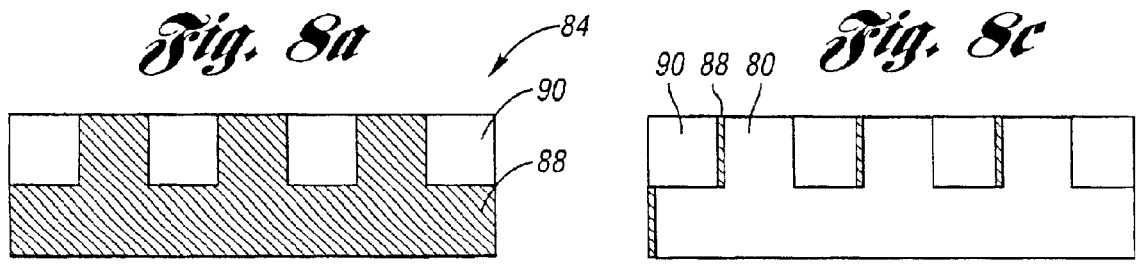
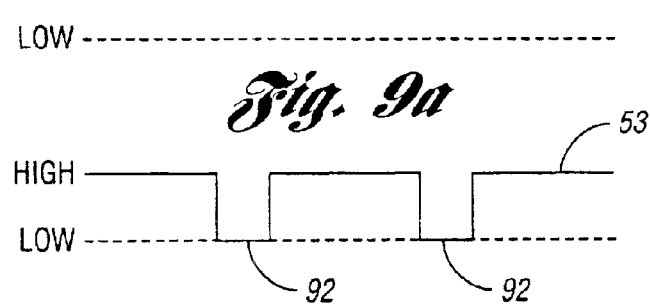
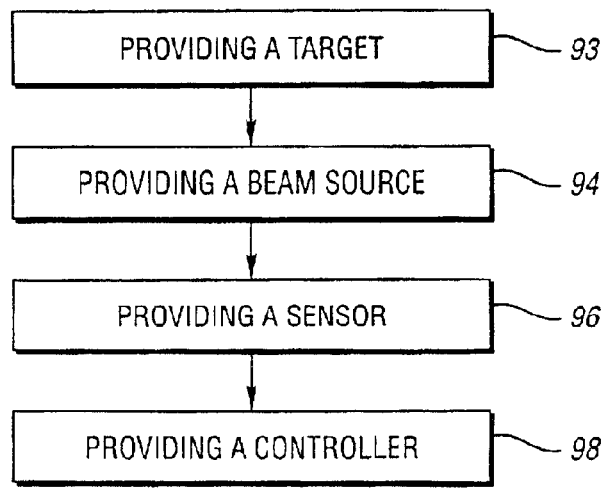

SYSTEM AND METHOD FOR ALIGNING A ROBOT DEVICE IN A DATA STORAGE LIBRARY

BACKGROUND OF THE INVENTION

1. Field of the Invention

The present invention relates to a system and method for aligning an automated robotic device in a data storage library.

2. Background

In the past, non-contacting position detection systems for use in automated tape storage libraries have used video camera systems for aligning a robot to select and remove magnetic tape cartridges stored within the library. For the robot to remove the tape cartridges, the robot must include some type of retrieval mechanism for securing the tape cartridges. For best performance, it is desirable to closely align the retrieval mechanism with the tape cartridges. Video camera systems can assist in aligning the robot by detecting indicia on or around the tape cartridge. The video system scans the indicia and determines a relationship of the indicia to the robot for alignment of the robot with the tape cartridge.

The video camera system usually includes a predetermined arrangement for the indicia. As described in U.S. Pat. No. 5,303,034, one such arrangement can be an "N-type" target. The video camera system scans the indicia to record a number of pixels which represent an image of the "N-type" target used for determining the center of the target.

In addition to using the robot for selecting and removing tape cartridges, the robot can also include a barcode scanner for reading information stored on a barcode label affixed to the tape cartridge. Consequently, the robot may include both video camera and barcode scanning systems.

As barcode scanning systems are smaller and less expensive than video camera systems, it would be desirable to provide a target which can be read by a barcode scanner, or similar system so that the robot would only need one system for reading the barcode labels affixed to the tape cartridges and the indicia on the targets affixed within the storage library system for use in aligning the robot. Moreover, it would be desirable to provide a scanning system for use in aligning the robot that is an improvement over existing video camera alignment systems.

In the future, memory in cartridge (MIC) systems will be used for collecting the information that was once read from a barcode. MIC systems utilize radio frequency (RF) technology to communicate the barcode information, instead of scanning the barcode. Accordingly, it would be desirable for the robot to include a scanning system for assistance with aligning the robot and a MIC system for collecting the RF information from the tape cartridge.

SUMMARY OF THE INVENTION

Accordingly, the present invention relates to a system for use in a data storage library having a plurality of cells for housing media cartridges, each cell having a location in the library, the library further having a moveable robot including for use in retrieving the cartridges from the cells. The system comprises a target in the library. The target has a first target portion with a first reflectivity, a second target portion with a second reflectivity, and a third target portion with a third reflectivity. In addition, the system comprises a source on the robot for directing a beam toward the target and an actuator for use in scanning the beam source over the first, second and third target portions. The beam reflects off the target portions as a reflected beam having an intensity based on the reflectivity of the respective target portion. Furthermore, the system comprises a sensor on the robot for sensing the reflected beam and generating a signal representing the intensity of the reflected beam. Finally, the system comprises a controller for receiving the signal from the sensor. The controller determines a location of the target in the library relative to the robot based on changes in the intensity of the reflected beam. The controller generates a control signal for use in aligning the robot with the cell based on a known relationship between the target location determined and the location of the cell.

The present invention also relates to a system for use in a data storage library having a plurality of cells for housing media cartridges, each cell having a location in the library, the library further having a moveable robot for use in retrieving the cartridges from the cells. The system comprises a target in the library. The target has a first target portion in a first plane, and a second target portion in a second plane different than the first plane. The first target portion has a first section with a first reflectivity and a second section with a second reflectivity. The second target portion has a third section with a third reflectivity. In addition, the system comprises a source on the robot for directing a beam toward the target and an actuator for use in scanning the beam source over the first, second and third sections of the first and second target portions. The beam reflects off the sections as a reflected beam. Furthermore, the system comprises a sensor on the robot for sensing the reflected beam and generating a signal representing the intensity of the reflected beam. Finally, the system comprises a controller for receiving the signal from the sensor. The controller determines a location of the target in the library relative to the gripper based on changes in the intensity of the reflected beam. The controller generates a control signal for use in aligning the gripper with the cell based on a known relationship between the target location determined and the location of the cell.

The present invention further relates to a method for use in a data storage library having a plurality of cells for housing media cartridges, each cell having a location in the library, the library further having a moveable robot for use in retrieving the cartridges from the cells. The method comprises providing a target in the library. The target has a first target portion with a first reflectivity, a second target portion with a second reflectivity, and a third target portion with a third reflectivity. In addition, the method comprises providing a source on the robot for directing a beam toward the first, second and third target portions. The beam reflects off the target portions as a reflected beam having an intensity based on the reflectivity of the respective target portion. Furthermore, the method comprises providing a sensor on the robot for sensing the reflected beam and generating a signal representing the intensity of the reflected beam. Finally, the method comprises providing a controller for receiving the signal from the sensor, determining a location of the target in the library relative to the robot based on changes in the intensity of the reflected beam, and generating a control signal for use in aligning the robot with the cell based on a known relationship between the target location determined and the location of the cell.

The present invention still further relates to a method for use in a data storage library having a plurality of cells for housing media cartridges, each cell having a location in the library, the library further having a moveable robot for use in retrieving the cartridges from the cells. The method comprises providing a target in the library. The target has a first target portion in a first plane, and a second target portion in a second plane different than the first plane. The first target portion has a first section with a first reflectivity and a second section with a second reflectivity. The second target portion has a third section with a third reflectivity. In addition, the method comprises providing a beam source on the robot for directing a beam toward the first, second and third sections of the first and second target portions. The beam reflects off the sections as a reflected beam. Furthermore, the method comprises providing a sensor on the robot for sensing the reflected beam and generating a signal representing the intensity of the reflected beam. Finally, the method comprises providing a controller for receiving the signal from the sensor, determining a location of the target in the library relative to the robot based on changes in the intensity of the reflected beam, and generating a control signal for use in aligning the robot with the cells based on a known relationship between the target location determined and the location of the cells.

BRIEF DESCRIPTION OF THE DRAWINGS

FIG. 6A illustrates an intensity line of a beam reflecting off the target in FIG. 3 in accordance with the barcode scanning system shown in FIG. 5;

FIG. 6B illustrates an intensity line of a beam reflecting off the target in FIG. 3 in accordance with the barcode scanning system shown in FIG. 5;

FIG. 7 illustrates a different target in accordance with the invention;

FIG. 8A illustrates a first target portion of the target shown in FIG. 7.

FIG. 8B illustrates a second target portion of the target shown in FIG. 7.

FIG. 8C illustrates a proper alignment of the target shown in FIG. 7;

FIG. 8D illustrates an improper alignment of the target shown in FIG. 7;

FIG. 9A illustrates an intensity line for the target illustrated in FIG. 8C;

FIG. 9B illustrates an intensity line for the target portion illustrated in FIG. 8D; and FIG. 10 illustrates a flowchart for a method of aligning a robot with a media cartridge in accordance with the invention.

DETAILED DESCRIPTION OF THE PREFERRED EMBODIMENTS

Figure 1:
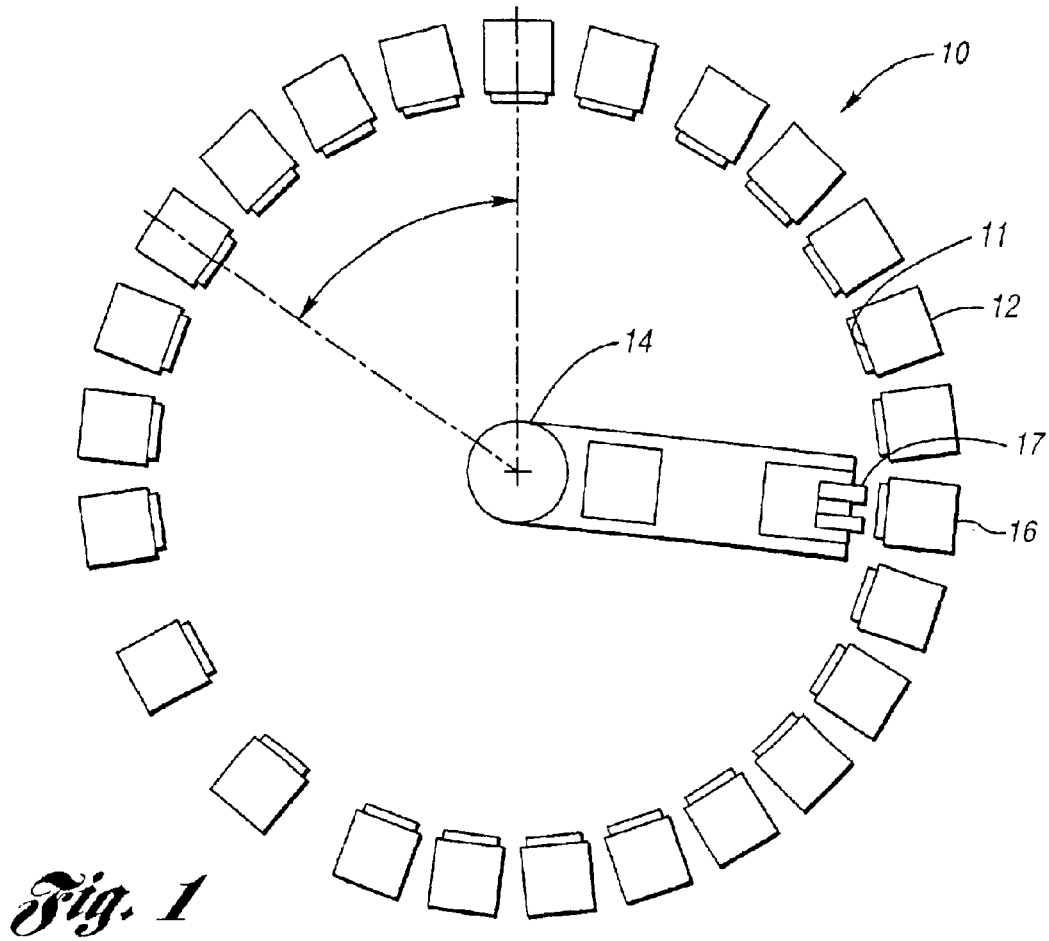
FIG. 1 illustrates an overhead view of a robot within a data storage library system in accordance with the invention.

FIG. 1 illustrates an overhead view of an exemplary data storage library system 10. Data storage library 10, which may be a tape library system, is an automated library system for storing and retrieving any type of data or media cartridges 11 for an associated host processor. An example of an automated magnetic tape cartridge handling system is the 4400 Automated Cartridge System (ACS), which handles media cartridges of the 3480-type, manufactured by Storage Technology Corporation of Louisville, Colo. Such a system is described in U.S. Pat. No. 5,303,034, which is hereby incorporated by reference.

Figure 2:
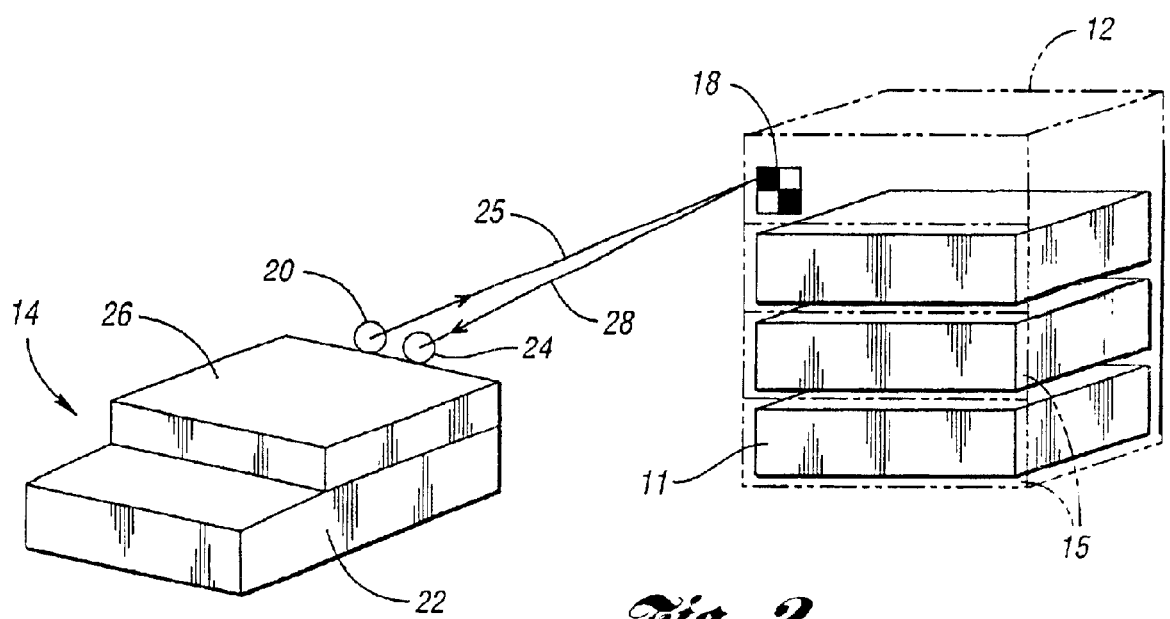
FIG. 2 illustrates a scanning arrangement for scanning a target in accordance with the invention.

Data storage library 10 comprises a number of storage magazines 12 which are arranged in a circular pattern around a robot 14. As shown in FIG. 2, storage magazine 12 includes a number of storage cells 15 for housing cartridges 11. Data storage library 10 also includes an operative element, such as a tape drive 16, for receiving the cartridges 11 for operation. The tape cartridges 11 include a barcode or memory in cartridge (MIC) arrangement for use by robot 14 in determining information about cartridges 11. Robot 14 is movable around data storage library 10 for reading the barcodes and for removing and replacing cartridges 11, with a gripper 17 or other means, from storage magazines 12 for operation in tape drive 16.

When reading the barcodes or retrieving cartridge 11, robot 14 needs to be properly aligned with a cell 15. Accordingly, targets, like target 18, are affixed within data storage library 10 to storage magazines 12 and tape drive 16 for assistance in aligning robot 14 with cells 15. Specifically, one or more targets 18 are affixed within storage library 10 in a known relationship to cells 15, and thereby, cartridges 11. By scanning targets 18, robot 14 can locate cells 15 for alignment. Such functionality is particularly advantageous for aligning robot 14 to improve the accuracy of getting cartridge 11 from cell 15, as well as placing cartridge 11 in drive 16. By improving the accuracy of alignment of robot 14 to cell 15 and tape drive 16, robot 14 may remove and replace cartridges 11 faster, improving data access time. This accuracy also helps to reduce the various impacts to cartridge 11 that may arise from removing and replacing cartridges 11.

For scanning target 18, and when desired for reading barcode labels affixed to cartridges 11, robot 14 includes a barcode scanning arrangement of a source 20, an actuator 22, a sensor 24, and a controller 26, as shown in FIG. 2. Source 20 is on robot 14 for directing a beam 25 toward target 18. The beam is preferably a laser, but may be any type of reflectable beam. Actuator 22 causes robot 14 to move for scanning source 20 over target 18. Actuator 22 can be located on robot 14, or remotely therefrom, for causing movement of source 20 and sensor 24. Beam 25 reflects off target 18 during scanning as reflected beam 28. Reflected beam 28 is sensed by sensor 24 on robot 14, which may be any type of sensor which corresponds to the type of beam 25. Sensor 24 generates a signal representing the intensity of reflected beam 28. Controller 26, like actuator 22, can be located on robot 14, or remotely therefrom, for receiving the signal from sensor 24. In some cases controller 26, or another element, can monitor robot 14 to record and track the movements of robot 14 as positional data. Controller 26 uses the signal from sensor 24 and the movement of actuator 22 to determine a location of target 18 relative to robot 14 based on changes in the intensity of reflected beam 28 occurring while scanning target 18. In response, controller 26 generates a control signal for use in aligning robot 14 with cell 15 based on the determined location of target 18 and the known relationship of target 18 to cell 15.

Target 18 comprises an unique arrangement of indicia which can be precisely scanned by the barcode scanning system. As shown with greater detail in FIG. 3, target 18 preferably includes coordinate (x and y) axes which define a checker-board pattern of four target portions 32, 34, 36, and 38. Target portion 32 is located at an upper left corner of target 18, target portion 34 is located at an upper right corner position of target 18, target portion 36 is located at a lower right corner portion of target 18, and target portion 38 is located at a lower left corner portion of target 18. Target portions 32, 34, 36, and 38 each have different reflectivity values in comparison to the immediately adjacent target portions. For example, the target portions 32, 34, 36, and 38 are preferably arranged in alternating black and white squares. The different reflectivities provide a contrast which defines edges 40, 42, 44, and 46 between the adjacent target portions 32, 34, 36, and 38. Accordingly, edges 40, 42, 44, and 46 represent the intersecting x-axis and y-axis. Preferably, target portions 32, 34, 36, and 38 are substantially the same size so that the x-axis and y-axis intersect at an origin approximately the center of target 18.

Robot 14 includes actuator 22 for scanning source 20 over target 18. As source 20 is scanned over target 18, beam 25 is directed toward target 18 and reflected off target 18 as reflected beam 28. Sensor 24 senses the intensity of reflected beam 28. The intensity of reflected beam 28 is based on the reflectivity of the portion of target 18 from which beam 25 is reflecting. Consequently, changes in the intensity of reflected beam 28 correspond to source 20 moving from one of the target portions, 32, 34, 36 and 38, across one of the edges 40, 42, 44, and 46, to another one of the target portions 32, 34, 36, and 38 which has a different reflectivity.

Figure 4:
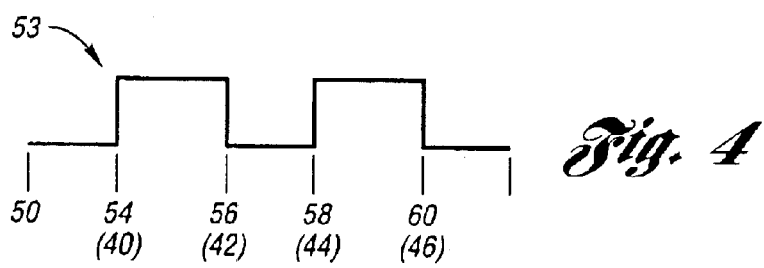
FIG. 4 illustrates an intensity line of a beam reflecting off the target in FIG. 3 in accordance with the barcode scanning system shown in FIG. 2.

Preferably, actuator 22 begins the scan of target 18 from a dead-reckoning point 50 in target portion 32. From dead-reckoning point 50, actuator 22 scans source 20 over target 18 along a scan path corresponding to path 52. Sensor 24 generates a signal representing the intensity of reflected beam 28 as source 20 passes over the target portions 32, 34, 36, and 38 having different reflectivities. The signal generated by sensor 24 can be illustrated with an intensity line 53 as shown in FIG. 4. The intensity of reflected signal 28 changes from a low state to a high state depending on the reflectivity of each target portion 32, 34, 36, and 38. For example, at dead-reckoning point 50, intensity line 53 is low due to the relatively low reflectivity of target portion 32. Intensity right line 53 remains low until intensity change point 54. At intensity change point 54, source 20 is directing a sufficient portion of beam 25 toward the relatively higher reflectivity of target portion 34. The relatively higher reflectivity of target portion 34 increases the intensity of reflected beam 28 which is sufficient to shift intensity line 53 to high.

As described above, the changes in intensity correspond to the edges 40, 42, 44, and 46 of the target portions. Actuator 22 preferably scans substantially horizontally from dead-reckoning point 50 to determine the location of edge 40, which corresponds to intensity change point 56 on intensity line 53. The determined location of edge 40 corresponds to the y-axis of the intersecting x-axis and y-axis. As the size of each target portion 32, 34, 36, and 38 is known, the determination of edge 40 provides controller 26 with enough information to determine the center of target portion 34.

Using this information, actuator 22 then moves along scan path 52 approximately to the center 57 of target portion 34 from which actuator 22 preferably scans in a substantially vertical direction to detect the location of edge 42. Similar to edge 40, edge 42 corresponds to a change in the intensity of reflected beam 28 and defines the x-axis of the intersecting x-axis and y-axis. On intensity line 53, edge 42 corresponds to intensity change point 56. Since both x-axis and y-axis have been located, the center 57 of target 18, which is the origin of the x and y axes, can now be determined by controller 26.

In some cases, the scanning can continue beyond determining the location of edge 42. If scanning is continued, actuator 22 moves approximately to the center of target portion 36 from which actuator 22 scans in a substantially horizontal direction to detect the location of edge 44. Similar to edge 40, edge 44 corresponds to a change in the intensity of reflecting beam 28 and further defines the y-axis of the intersecting x-axis and y-axis. On intensity line 53, edge 44 corresponds to intensity change point 58. Finally, actuator 22 moves approximately to the center of target portion 38 from which actuator 22 scans in a substantially vertical direction to detect the location of edge 46. Similar to edge 42, edge 46 corresponds to a change in the intensity of reflecting beam 28 and further defines the x-axis of the intersecting x-axis and y-axis. On intensity line 53, edge 46 corresponds to intensity change point 60. Such continued scanning can be used to confirm the location of origin 57 first determined by detecting edges 40 and 42.

Controller 26 receives the signals which corresponds to each of the intensity changes of reflected beam 28 from sensor 24. Based on the changing intensities, controller 26 determines origin of the intersecting x-axis and y-axis to locate the center of target 18 in data storage library 10 relative to robot 14. Controller 26 then generates a control signal for use in aligning robot 14 with cells 15 based on the known relationship between the location of target 18 and cells 15. In this manner, robot 14 can be aligned with cell 15 for reading barcode labels on cartridges 11 or for removing and replacing the cartridges in cells 15 for operation in tape drive 16.

It should be noted here that the scanning of edges 40, 42, 44, and 46 is not intended to be limited to scan path 52. Similarly, the scanning arrangement can move in any direction and in any order through the target 18. Moreover, actuator 22 can include a searching routine for locating target 18 in the event of dead-reckoning point 50 being located off of target 18 due to extreme shifting, or other changes.

Figure 5:
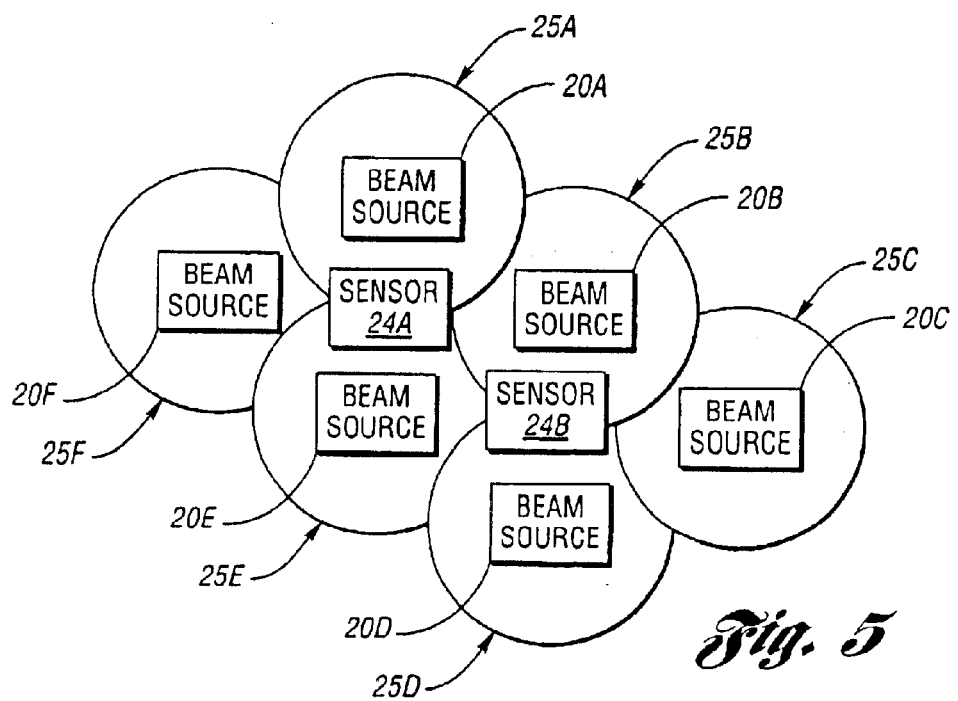
FIG. 5 illustrates a barcode scanning system having staggered beam sources and sensors in accordance with the invention.

In accordance with the preferred embodiment of the present invention, the scanning system includes six beam sources 20A–20F arranged in a staggered pattern about two staggered sensors 24A and 24B, as shown in the end view of FIG. 5. This arrangement preferably supplies an even pattern of beams 25A–25F to completely overlap sensors 24A and 24B with reflected beams 28. Actuator 22 scans all six beams sources over target 18 along scan path 52, as described above, whereby each sensor 24A and 24B senses a total intensity of the six beams 25A–25F reflecting from target 18 for determining changes in the intensity which correspond to edges 40, 42, 44, and 46.

Advantageously, the signal generated by sensor 24A is compared to the signal generated by sensor 24B by controller 26 performing an exclusive-or function. As sensor 24A is offset in the x-axis and the y-axis from sensor 24B, when target 18 is scanned along scan path 52 from target portion 32 to target portion 34, sensor 24B enters target portion 34 before sensor 24A does. As such, sensor 24B receives the stronger intensity signal being reflected from target portion 34 before sensor 24A. Consequently, the signal intensity of sensor 24B begins to increase toward the high reading prior to sensor 24A, as shown in the corresponding intensity line 53 of FIG. 6A. When sensor 24A satisfies an exclusive-or function with sensor 24B, controller 26 determines a period of transition 64, which when scanning from target portion 32 to target portion 34, corresponds to edge 40 (y-axis). Preferably, by adding half the difference of the signals received by sensor 24A and 24B during transitional period 64, the location of edge 40 is accurately found without being affected by reflectivity variations or sensor response variations. From target portion 34, edge 42 (x-axis) is determined in a similar exclusive-or manner. Edge 42 corresponds to transition period 66. Advantageously, this staggered scanning arrangement allows the sizes of source 20 and sensors 24 to be reduced and the precision of the edge detection to be enhanced, over the single beam source and sensor arrangement described above.

Another target 80, is illustrated in FIG. 7, can be used in both the scanning arrangements described above. Target 80 includes a first target portion 82 in a first plane and a second target portion 84 in a second plane. The first target portion 82 includes a target section 86 having a first reflectivity, as shown in FIG. 8A. The second target portion 84 includes a target section 88 having a second reflectivity and a target section 90 having a third reflectivity, as shown in FIG. 8B. Advantageously, the first reflectivity is substantially similar to the third reflectivity. Target section 86 is arranged into a pattern which corresponds to target section 88. Target 80 is commonly referred to as a gun-sight target having the first target portion 82 secured to a static element that is offset from a static element to which the second target portion 84 is secured. Like when viewing a gun-sight along a barrel of a gun, if the first portion 82 is properly aligned with the second portion 86, the barrel of the gun, or in the case of this invention, the robot 14 is properly aligned. Accordingly, when the scanning arrangement is properly aligned with target 80, target section 86 is properly aligned with target section 88, and thus, target section 88 is hidden behind target section 86, as shown in FIG. 8C. When the scanning arrangement is not properly aligned with target 80, target section 86 is not properly aligned with target section 88, and thus, target section 88 is not hidden behind target section 88, as shown in FIG. 8D.

An intensity line 53 for scanning target 80 when target portion 82 is properly aligned with target portion 86 is shown in FIG. 9A. Since the different reflectivity of target section 88 is hidden behind target portion 82, the scanning arrangement senses a uniform reflectivity. Accordingly, sensor 24 does not receive any substantial changes in intensity of reflecting beam 28 during scanning. An intensity line 53 for scanning target 80 when target portion 82 is not properly aligned with target portion 86 is shown in FIG. 9B. Since the different reflectivity of target section 88, which in this embodiment is relatively less reflective than the reflectivity of target sections 86 and 90, is not completely hidden behind target portion 82, the scanning arrangement does not see a uniform reflectivity. Accordingly, sensor 24 receives changes in intensity as source 20 passes over target section 88, whereby the intensity of reflected signal 28 decreased. The changes in intensity of reflected beam 28 are generally shown with reference numeral 92. The duration of time in which the change in intensity is sensed by sensor 24 corresponds to the amount of target section 88 showing behind target portion 82. This amount can be used by controller 26 to determine the movements which can be performed by actuator 24 to align the scanning arrangement so that target 80 can be properly aligned with robot 14.

Figure 3:
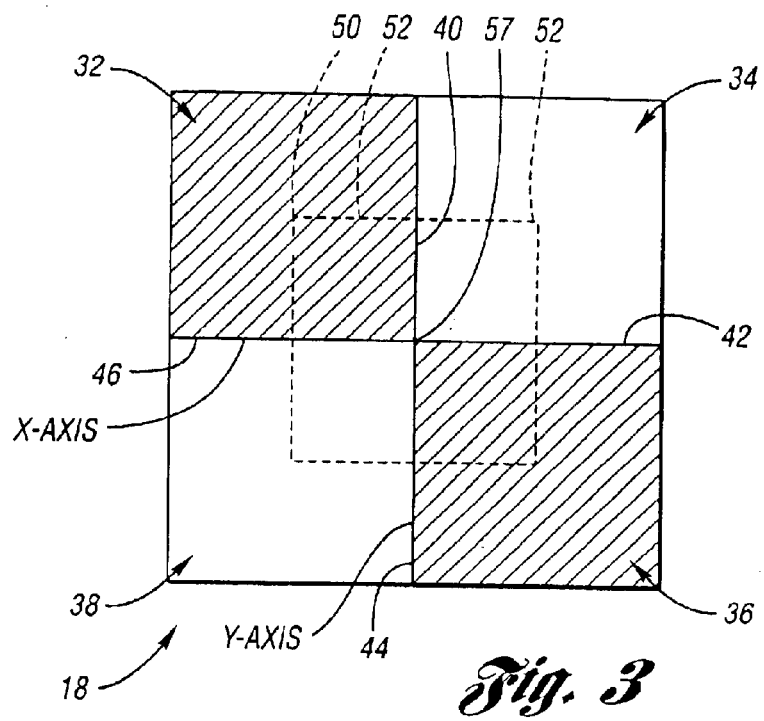
FIG. 3 illustrates a target in accordance with the invention.

Referring now to FIG. 10, and with continuing reference to FIGS. 2 and 3, a method is shown for use in data storage library 10 having a plurality of cells 15 for having cartridges 11, each cell 15 having a location in library 10, the library 10 further having a moveable robot 14 for use in retrieving the cartridges. The method comprises, at block 93, providing target 18 in the library. The target has target portion 32 with a first reflectivity, a second target portion 34 with a second reflectivity, and a third target portion 36 with a third reflectivity. In addition, the method comprises, at block 94, providing a source 20 on robot 14 for directing a beam 25 toward the first, second and third target portions 32, 34, and 36. Beam 25 reflects off the target portions as a reflected beam 28 having an intensity based on the reflectivity of the respective target portion. Furthermore, the method comprises, at block 96, providing a sensor 24 on robot 14 for sensing the reflected beam and generating a signal representing the intensity of reflected beam 28. Finally, the method comprises, at block 98, providing a controller 26 for receiving the signal from sensor 24, determining a location of target 18 in media storage library 10 relative to robot 14 based on changes in the intensity of reflected beam 28, and generating a control signal for use in aligning robot 14 with cell 15 based on a known relationship between target 18 location determined and the location of cell 15.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a data storage library having a plurality of cells for use in housing media cartridges, each media cartridge having a location in the library, the library further having a moveable robot for use in retrieving the cartridges from the cells, a system for aligning the robot with a cell, the system comprising:

a target in the library, the target having a first target portion in a first plane, and a second target portion in a second plane different than the first plane, the first target portion having a first section with a first reflectivity and a second section with a second reflectivity, the second target portion having a third section with a third reflectivity;

a source on the robot for directing a beam toward the target;

an actuator for use in scanning the beam source over the first, second and third sections of the first and second target portions, wherein the beam reflects off the sections as a reflected beam;

a sensor on the robot for sensing the reflected beam and generating a signal representing the intensity of the reflected beam; and a controller for receiving the signal from the sensor, determining a location of the target in the library relative to the robot based on changes in the intensity of the reflected beam, and generating a control signal for use in aligning the robot with the media cartridge based on a known relationship between the target location determined and the location of the media cartridge.

2. The system of claim 1 wherein the second reflectivity is substantially different from the first reflectivity, and the third reflectivity is substantially similar to the first reflectivity.

3. The system of claim 1, wherein the robot includes a gripper which is aligned by the controller for use in retrieving the cartridge from the cell.

4. In a data storage library having a plurality of cells for use in housing media cartridges, each cell having allocation in the library, the library further having a moveable robot for use in retrieving the cartridges from the cells, a method for aligning the robot with a cell, the method comprising:

providing a target in the library, the target having a first target portion in a first plane, and a second target portion in a second plane different than the first plane, the first target portion having a first section with a first reflectivity and a second section with a second reflectivity, the second target portion having a third section with a third reflectivity;

providing a source on the robot for directing a beam toward the first, second and third sections of the first and second target portions, wherein the beam reflects off the sections as a reflected beam;

providing a sensor on the robot for sensing the reflected beam and generating a signal representing the intensity of the reflected beam; and providing a controller for receiving the signal from the sensor, determining a location of the target in the library relative to the robot based on changes in the intensity of the reflected beam, and generating a control signal for use in aligning the robot with the cell based on a known relationship between the target location determined and the location of the cell.

5. The method of claim 4 further comprising providing an actuator for use in scanning the beam source over the first, second and third sections of the first and second target portions, wherein the beam reflects off the sections as a reflected beam.

6. The method of claim 4 wherein the second reflectivity is substantially different from the first reflectivity, and the third reflectivity is substantially similar to the first reflectivity.

7. The method of claim 4 wherein the robot includes a gripper which is aligned by the controller for use in retrieving the cartridge from the cell.

\* \* \* \* \*